United States Patent
Averyanov et al.

(10) Patent No.: US 11,281,287 B2
(45) Date of Patent: Mar. 22, 2022

(54) METHOD OF GENERATING AN AUGMENTED REALITY ENVIRONMENT

(71) Applicant: DEVAR ENTERTAINMENT LIMITED, Nicosia (CY)

(72) Inventors: Vitaly Vitalyevich Averyanov, Tula (RU); Andrey Valeryevich Komissarov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 16/630,646

(22) PCT Filed: Jul. 13, 2017

(86) PCT No.: PCT/IB2017/054245
§ 371 (c)(1),
(2) Date: Jan. 13, 2020

(87) PCT Pub. No.: WO2019/012315
PCT Pub. Date: Jan. 17, 2019

(65) Prior Publication Data
US 2020/0168002 A1    May 28, 2020

(51) Int. Cl.
*G06F 3/01* (2006.01)
*G05D 1/00* (2006.01)
(Continued)

(52) U.S. Cl.
CPC .......... *G06F 3/011* (2013.01); *G05D 1/0038* (2013.01); *G06T 19/006* (2013.01); *G01S 13/89* (2013.01); *G06T 2219/024* (2013.01)

(58) Field of Classification Search
CPC .. G06T 2219/024; G05D 1/0038; G06F 3/011
See application file for complete search history.

(56) References Cited

U.S. PATENT DOCUMENTS 10,068,374 B2 *   9/2018   Miller ................... G06K 9/38
2007/0003162 A1 * 1/2007   Miyoshi ................ G08G 1/167
                                                          382/276
(Continued)

FOREIGN PATENT DOCUMENTS

GB            2532465 A        5/2016

*Primary Examiner* — Ryan R Yang
(74) *Attorney, Agent, or Firm* — Nadya Reingand; Yan Hankin

(57) ABSTRACT

The invention relates to computerized data processing, more particularly to methods of generating an augmented reality environment, and comprises the following steps: controlling the position of an unmanned transport vehicle having a built-in camera, determining the position coordinates of the unmanned transport vehicle, transmitting a captured camera image to a user display means for visualization, exchanging messages in real time between the user and at least one second user located within visual range of the unmanned transport vehicle and equipped with augmented reality visualization means, visualizing an image captured by a camera of the second user using augmented reality generating means of the second user, visualizing a spatial model of the user, wherein the position of the spatial model in the visualized image corresponds to the position of the unmanned transport vehicle in the captured image from the camera of the second user.

17 Claims, 2 Drawing Sheets

(51) Int. Cl.
*G06T 19/00* (2011.01)
*G01S 13/89* (2006.01)

(56) References Cited

U.S. PATENT DOCUMENTS

| | | | |
|---|---|---|---|
| 2009/0097710 A1* | 4/2009 | Sroka | G06T 7/74 |
| | | | 382/103 |
| 2015/0092020 A1 | 4/2015 | Vaughn | |
| 2015/0142391 A1* | 5/2015 | Flynn | H04W 16/20 |
| | | | 703/1 |
| 2015/0210387 A1* | 7/2015 | Ling | G05D 1/0022 |
| | | | 701/2 |
| 2016/0125638 A1* | 5/2016 | Grimaud | G06T 13/20 |
| | | | 348/169 |
| 2016/0278631 A1* | 9/2016 | Vogler | A61B 3/102 |
| 2018/0130260 A1* | 5/2018 | Schmirler | G06Q 10/0633 |
| 2019/0197755 A1* | 6/2019 | Vats | G06T 13/205 |
| 2020/0120308 A1* | 4/2020 | McMillan | G06F 30/12 |

* cited by examiner

METHOD OF GENERATING AN AUGMENTED REALITY ENVIRONMENT

The closest in technical essence is the method of implementing a system for controlling a plurality of unmanned vehicles, comprising controlling the position of a plurality of unmanned vehicles with built-in cameras, transmitting to the virtual reality booth of a remote user the images obtained from the built-in cameras, visualizing the acquired images, corresponding to the received images.

The known system can be used to visualize events or images that generate a virtual reality environment for a remote user using unmanned controlled vehicles.

Another drawback of the known solution is the insufficient reliability in some cases, caused by the limitations of captured image parameters, which do not allow the safe management of an unmanned vehicle in difficult conditions of insufficient obstacles visibility.

The technical result achieved is to increase the informational intensity of the received data, to provide the possibility of interaction with other users during the communication session with the unmanned vehicle and to increase the reliability and safety of the system.

Figure 1:
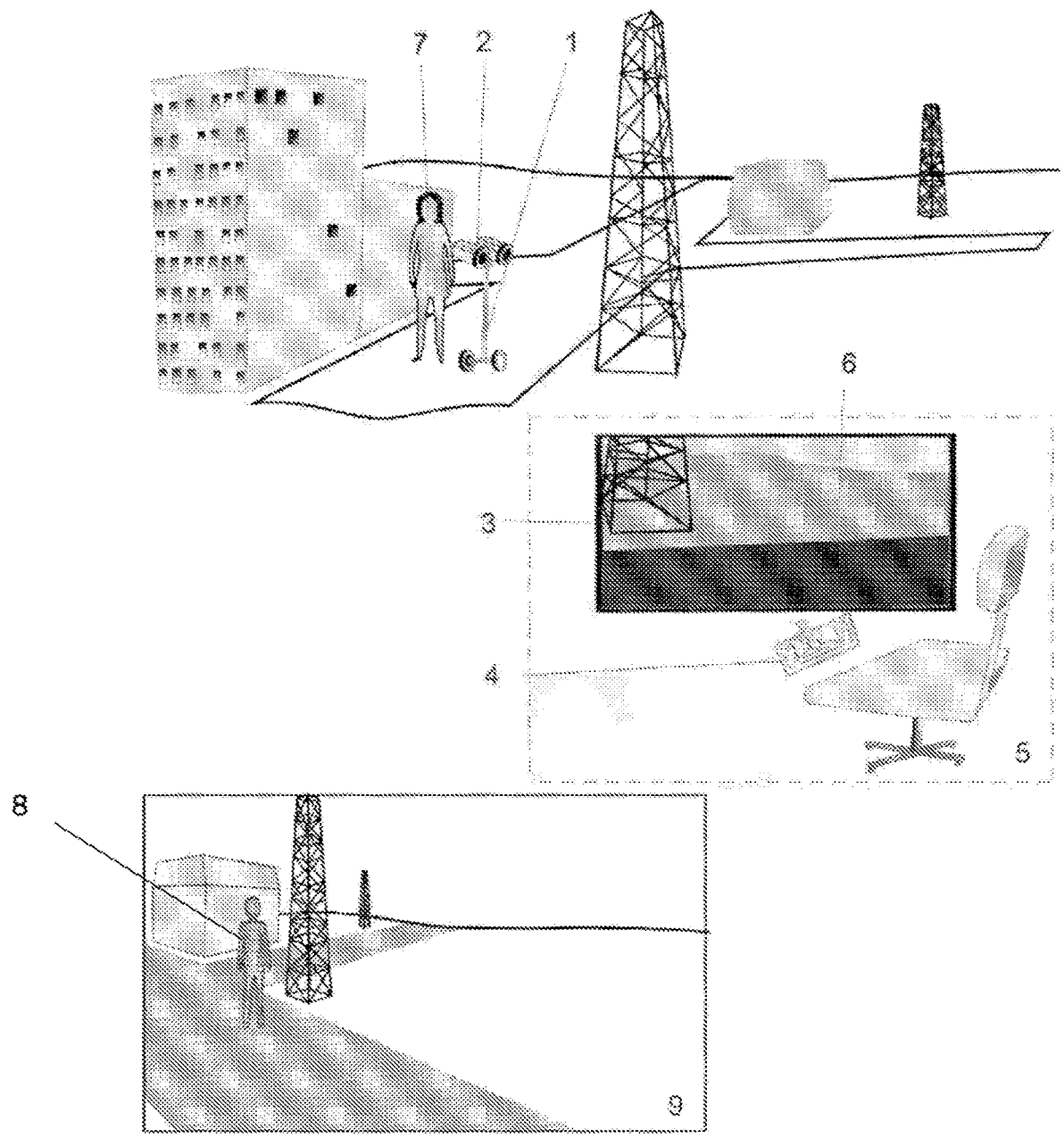
Figure 2:
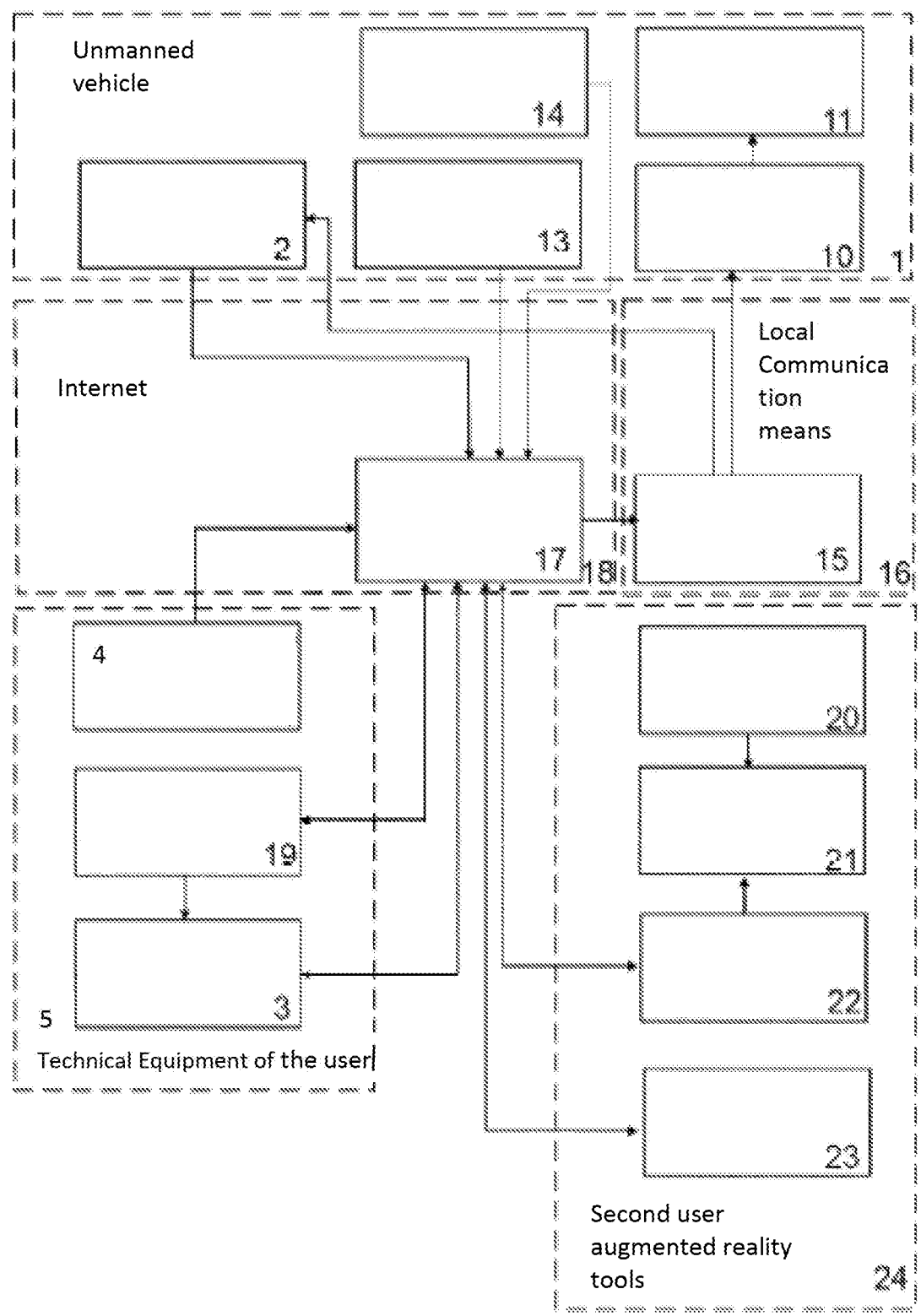

FIG. 1 shows an exemplary embodiment of a method for generating augmented reality environment; FIG. 2 is a block diagram of a system constructed to implement a method for generating a virtual reality environment using a server.

The following numbering is used in the drawings: 1—unmanned vehicle, 2—built-in camera, 3—user display equipment, 4—unmanned vehicle controls, 5—technical equipment of the user, 6—image captured by an unmanned vehicle video camera and output by tools of user display equipment, 7—second user, 8—user's spatial model, 9—image rendered by the augmented reality tools of the second user, including camera captured image is displayed on top of the spatial model of the user, 10—command receiver, 11—actuators, 13—dockable toolbar, 14—test probe, 15—translator, 16—local communication means, 17—server, 18—Internet, 19—user calculation tools, 20—second user's camera, 21—second user visualization tools, 22—second user calculating tools, 23—audio communication tools, 24—second user augmented reality tools.

The method for generating an augmented reality environment comprises controlling position of an unmanned vehicle equipped with build-in camera by tools of appropriate user controls, determining coordinates of the unmanned vehicle position, transmitting captured image signals of the camera to user visualization tools, visualizing the image captured by the second user's camera by means of tools for generating the augmented reality, said image being overlaid by user's spatial model, the movement of the elements of which and the position in space is generated on the basis of the unmanned vehicle positioning data and the camera direction, while also providing voice and/or text messages to be exchanged between the user and at least one second user in real-time.

The user model is generated either by means of the user's computing tools and transmitted for visualization in real time to the second user's augmented reality generating tools, or by the second user's computing tools.

An unmanned vehicle is an unmanned aerial vehicle and/or an unmanned ground vehicle and/or an unmanned water surface vehicle and/or an unmanned underwater vehicle and/or an unmanned spacecraft.

The implementation of the method of generating the augmented reality environment allows for equipping of an unmanned vehicle in addition to the camera also with measuring sensors calibrated with a camera, such as an IR sensor, a radar, an echo sounder or an electric field strength sensor. In this case, in addition to the captured image, thermal or radar image signals or signals formed by reflected sound signals or electric field strength measurement signals are transmitted to the user computing tools, respectively. The signals obtained from the output of the corresponding sensor, if the coordinates of the unmanned vehicle are known, provide not only the capability to visualize the distribution surface of the measured value along with the image of the captured camera, but also to generate and display a spatial model of the measured quantity provided that measurements are taken from different angles.

The user's display tools in a particular embodiment, wherein the spatial model of the area which is being examined by the unmanned vehicle, or spatial model of the measured quantity is displayed is a tools of generating a virtual reality, for example, a virtual reality helmet.

The method for generating the augmented reality environment works as follows.

The user, with the help of unmanned vehicle controls, initiates and controls the movement of an unmanned vehicle. A camera built into the unmanned vehicle captures an image that is being transmitted over a radio channel using tools of mobile communication, for example, Wi-Fi, GPRS or others, to the input of the display tools at the location of the user remote from the unmanned vehicle controlled by said user.

Coordinates of the unmanned vehicle position are determined in real time using global or local positioning, preferably using GPS or GLONASS satellite system. Other systems can also be used for positioning, for example, using a cellular network, using COO method, AOA method or others. Data containing the coordinates of the unmanned vehicle is being transmitted to the user's calculation tools, where a movable spatial model of the user is formed on the basis of the user's spatial model created in advance and stored in memory, said spatial model adapted to move its elements, for example, turning the head and/or body, limbs, etc. and also forming other visualization, depending on positioning of the unmanned vehicle in the frame of the image captured by the camera of the second user, that is, based on the coordinates of unmanned vehicle, the position of its chambers, the coordinates of the second user and the angle of rotation of his camera. The data on the generated movable model is transmitted through the server for visualization to the tools for generating the augmented reality of the second user.

The movable spatial model of the user can also be generated by tools of the second user's calculation tools based on the obtained data of the coordinates of the unmanned vehicle, the direction of the camera and the data stored in the memory necessary for visualization of the spatial model.

If the user spatial model data is stored in the second user's augmented reality generating tools, in a particular embodiment of the invention the position of the movable model on the rendered image is determined by detecting an unmanned vehicle on the frame of the image captured by the second user's camera, determining its coordinates and relative dimensions in the frame defining the distance between the second user and the unmanned vehicle and then the replacement of the part of an image containing the unmanned vehicle with the image of the movable user model. In this case, the substitution is performed at a scale corresponding to the range between the second user and the unmanned vehicle.

The movable spatial model of the user is an animated picture containing a user image where it's lip movement corresponds to the sounds of voice messages it generates, the direction of the body corresponds to the direction of movement of the unmanned vehicle, the direction of the head turn to the angle of rotation of the camera of the unmanned vehicle, the movement of the hands and feet corresponds to the movement of the unmanned vehicle funds at certain point in time. Thus, the presence of the movable model creates an illusion of the user's presence next to the second user.

During the user's session with the unmanned vehicle, the second user equipped with augmented reality visualization tools is near or at the seeing distance from unmanned aerial vehicle, which allows him to formulate explanations and comments regarding the movement of the unmanned vehicle, including providing commenting on visible objects or warn of possible threats to moving of unmanned vehicle in a particular direction.

The exchange of voice or text messages enables the user to interact with the second user or with the other user, that is, with other users during a session with the unmanned vehicle.

The possibility of a second user to receive the image of the area being examined from a different angle and notify regarding possible dangers arising while moving the unmanned vehicle increases the reliability and safety of the implementation of the method.

The second user's augmented reality generation tools provide visualization of the captured image of the camera and the spatial model of the user displayed over the captured image, as well as receiving and reproducing the user's voice messages in real time, as well as transmitting the user's own voice messages.

The preferred embodiment of the device for implementing the method for generating the augmented reality environment comprises four main units: technical equipment of the user, second user augmented reality generation tools, unmanned vehicle, and wireless communication tools including local command repeater.

The technical equipment of the user includes the unmanned vehicle control tools, the calculation tools adapted to generate a spatial model and means to display image obtained from the unmanned vehicle camera, said display means in a particular implementation may be augmented reality tools.

The tools for generating augmented reality can be implemented, for example, as augmented reality or virtual reality helmet, and include a camera, visualization tools, computing tools, and audio communication tools.

The unmanned vehicle, comprising an unmanned aerial vehicle and/or an unmanned ground vehicle and/or an unmanned surface vehicle and/or an unmanned underwater vehicle and/or an unmanned spacecraft, includes a camera connected by wireless communication means with the user computing tools and actuators of the unmanned vehicle, including engines, rudders, regulators, etc., connected with the corresponding control commands radio signals receiver.

Wireless communication means include tools for distributing signals via the Internet, a server and a local command repeater. Wireless communication means are implemented in accordance with Wi-Fi standards or GPRS or LTE standards, or the like.

In a particular embodiment of the method, the device it's implementation may not include a local communication command repeater. In this case, the commands for driving an unmanned vehicle come through a modem using Wi-Fi or GPRS or LTE, etc.

The device for implementing the method of generating the augmented reality environment works as follows.

Signals comprising the captured image from the unmanned vehicle camera controlled by the user are transmitted via a wireless communication link to the server, where from they are fed via the Internet to the display devices for visualization.

Control commands generated by the user using the unmanned vehicle controls submitted to the unmanned vehicle actuators through the server, the command repeater and the receiver.

The movable spatial model of the user is generated with the help of appropriate software tools installed in the user's calculation tools and transmitted for visualization to the augmented reality generation tolls of the second user.

In another embodiment, the movable spatial model is formed by the augmented reality tools of the second user, operating under the control of appropriate software. The initial data for generation of the movable spatial model is the data of the model itself, as well as the unmanned vehicle positioning data, the direction of its camera, the positioning data of the second user, and the direction of his camera.

Users can exchange voice messages using tools of audio communications, which involve communication of the user's display equipment and the augmented reality tools of the second user via the server.

In addition to the camera, an unmanned vehicle can be equipped with an infrared sensor or an electric field strength sensor, or a radar or echo sounder. In this case, the signals from the sensor output are transmitted through the server to the user's computing means, wherein depending on the positioning data of the unmanned vehicle, the images, created by the signals of the test probe and previously stored spatial model of the analysis area are associated with each other. This spatial model of the area is fed to the user's display means and provides visualization what is being viewed by tools of an unmanned vehicle in cases of difficulties in obtaining an image from the camera, for example, in conditions of poor visibility.

EXAMPLE 1

User's task is to inspect the industrial facility using an unmanned vehicle.

The technical tools of the user located far from the industrial facility allow controlling the unmanned gyroscooter and the video cameras installed on it. The gyroscooter is equipped with two video cameras, which provide ability to form a three-dimensional image of the objects of the surrounding space. The unmanned gyroscope is also equipped with a GPS receiver.

The user controls the unmanned gyroscope by transmitting command signals via the Internet to the repeater and then to the receiver of the radio signals of the commands and to the gyroscope actuators.

The user receives an image captured by the cameras that is output to a display means, which can be a display or augmented reality glasses, or a virtual reality helmet, or the like.

Inspection checkup is accompanied by a second user—a local company employee, equipped with an augmented reality glasses with an integrated camera, microphone and audio playback means.

During the inspection session, the user's computing means adapted to generate a user movable model based on the positioning data of the gyroscooter and the direction of the cameras. The data of the generated user movable model is transmitted through the server to the augmented reality tools of the second user for visualization.

The second user has the opportunity to observe the image of the inspected area with his camera, as well as the spatial model of the inspector user, whose position in the image corresponds to the mutual position in space of the gyroscooter and the second user, and also to the direction of the second user's camera, while the direction of the head of the spatial model of the user corresponds to the direction of the gyroscooter cameras.

During the inspection of the area, the user can ask questions to the second user who has the opportunity to answer questions, accompanying the video sequence received by the user with additional information, for example, about the parameters of functioning of the equipment caught in the eyeshot. In addition, the second user has the opportunity to advise on the direction of movement of the unmanned gyroscooter, preventing the hitting obstacles and other emergencies.

The mutual communication between the user and the second user regarding the unmanned vehicle caught in the eyeshot increases the informative value of the method implementation.

If the unmanned vehicle leaves the view of the second user's camera, the spatial model image also disappears from the captured image, so that the unmanned vehicle is a marker for visualizing the spatial model of the user.

Thus, an illusion of presence of the user is created for the second user and the capability of mutual communication enhances this effect of the presence of the user next to the second user.

EXAMPLE 2

The task of the user is to conduct a guided tour for educational purposes for students in the architectural complex with the help of an unmanned vehicle.

The technical tools of the user located at a distance from the industrial facility allow to control an unmanned aerial vehicle—a quadrocopter and video cameras and a GPS receiver installed on it.

The technical support of the quadrocopter's flight is performed by a local operator providing flight preparation, including charging the batteries or refueling the device with fuel on the spot. At the same time, the control of the flight direction and its duration within the established limits, determined by the charge of the batteries and the range of local radio communication, is being carried out by the remote user himself through the transmission of command signals via the Internet to the repeater and then to the command radio receiver and to the quadrocopter actuators.

The user receives an image captured by the quadrocopter's cameras, which is output to a display means, that can be a display or augmented reality glasses, or a virtual reality helmet, etc.

The calculation tools form a movable spatial model of the user based on the derived coordinates of the quadrocopter and the direction of its camera. The generated spatial model of the user is transmitted in real time to the server.

One or more second users for whom the sightseeing tour is conducted have augmented reality glasses, which receive and visualize the image from the augmented reality camera and the spatial model of the user conducting the excursion and making necessary explanations. In this case, the position of the rendered user movable spatial model on the augmented reality tools of the second users is calculated on the basis of the coordinates and direction of the camera of the corresponding second user by means of his augmented reality tools.

One or more second users have the opportunity to ask questions and receive replies in real time during the tour. In this case, the exchange of messages between the user and the second user is carried out in the conference mode, that is, the second users hear each other's messages.

EXAMPLE 3

After an industrial accident, rescue and restoration work should be carried out in the area where smoldering fires remain.

The user launches an unmanned aerial vehicle (UAV) over the territory where the accident occurred. The UAV is equipped with a camera, GPS and IR sensor.

The territory of the accident is characterized by poor visibility and has places that are dangerous for a human, which are not known in advance. Dangers can be smoldering floors, invisible in the smoke wells, etc. The use of the camera in such conditions is ineffective.

However, a spatial model of the specified territory has already been created and can be visualized by the user's display equipment.

The user having before his eyes the spatial model of the territory manages UAV flight, while he has the opportunity to receive the data of the IR sensors from different points during the flight of the UAV, providing the second user with information about the hidden dangers or about the existence of living beings under the rubble, which are not visible at his angle.

EXAMPLE 4

The objective of the user is to make a plan or three-dimensional model of the underwater object. An unmanned vehicle is a boat equipped with a camera and an echo sounder. The second user accompanies the boat under water and is equipped with a helmet of augmented reality.

In view of the low transparency of the aquatic environment, the echo sounder signals, that make it possible to obtain an unfolded image of the underwater object, become important.

The second user receives an image from the output of his camera and the movable model of the user at the location on the frame of the boat.

Elements of the examined object in the places of absence of visibility appear on the image obtained with the reflected signals of the echo sounder and the user does not have the opportunity to identify the element or its material. At his request, the second user comes nearer to the examined element and identifies it on the spot, reporting the results to the user.

The user, in turn, receives the voice messages of the second user and has the ability to mark, for example, with a corresponding texture, elements of the object visible only using the echo sounder and thus refine the plan or extend the spatial model of the examined object.

As a result of the implementation of the method, a three-dimensional texturized model of the underwater object is generated.

Evaluating thereby the environment of the second user, the user has the opportunity to advise on the laying of the route optimal from the point of view of safety or efficiency.

The method of generation of the augmented reality environment can be implemented with the use of standard instruments and computing means, including unmanned vehicles, remote radio control devices, computer tools based on a processor, video cameras, etc.

The method of generation of the augmented reality environment provides higher information content of the received data, the possibility of interaction with other users during the communication session with the unmanned vehicle and is more reliable and safe in implementation.

What is claimed is:

1. A method for forming an augmented reality environment comprising the following steps:
   controlling a position of an unmanned vehicle with a built-in camera,
   determining the position coordinates of the unmanned vehicle,
   transferring a captured image from the camera to a display means of a user for visualization,
   messaging in real-time between the user and at least one second user located at a distance from the unmanned vehicle and equipped with augmented reality visualization means,
   visualizing an image from the second user captured by a camera of the second user's augmented reality forming means,
   visualizing a movable spatial model of the user, wherein a position of the movable spatial model in the visualized image corresponds to the position of the unmanned vehicle on the captured image from the second user's camera and direction of the camera of the second user; and
   moving elements of the movable spatial model of the user depending on coordinates of the unmanned vehicle, position of chambers of the unmanned vehicle, coordinates of the second user and angle of rotation of the camera of the second user.

2. The method of claim 1, wherein the unmanned vehicle is an unmanned aerial vehicle or an unmanned ground vehicle or an unmanned water surface vehicle or an unmanned underwater vehicle or an unmanned spacecraft.

3. The method of claim 1, wherein the model of the user is generated by the user's computing means and transmitted for visualization in real time to the second person's augmented reality forming means.

4. The method of claim 1, wherein the model of the user is generated by the computing means of the second user for visualization by its augmented reality forming means.

5. The method of claim 1, wherein the position of the user's spatial model is determined based on data comprising coordinates of the unmanned vehicle and a direction of its camera view.

6. The method of claim 1, wherein voice or text messages are exchanged between the user and at least one second user.

7. The method of claim 1, wherein the unmanned vehicle is controlled by a corresponding controls of the user.

8. The method of claim 1, wherein the unmanned vehicle is also equipped with measurement sensors calibrated with the camera.

9. The method of claim 8, wherein the measurement sensors include one or more of an infrared sensor, a radar, an echo sounder and an electric field strength sensor.

10. The method of claim 1, wherein the spatial model of the user is an animated picture containing the user's image.

11. The method of claim 10, wherein the movement of user's spatial model's lips corresponds to sounds of voice messages it generates, a direction of a body corresponds to the direction of movement of the unmanned vehicle, a direction of a rotation of a head corresponds to an angle of rotation of the camera of the unmanned vehicle, moving of hands and feet corresponds to the unmanned vehicle movement at a specific moment in time.

12. The method of claim 1, wherein the augmented reality forming means includes augmented reality glasses or a virtual reality helmet.

13. The method of claim 1, wherein the unmanned vehicle is an unmanned aerial vehicle.

14. The method of claim 1, wherein the unmanned vehicle is an unmanned ground vehicle.

15. The method of claim 1, wherein the unmanned vehicle is an unmanned water surface vehicle.

16. The method of claim 1, wherein the unmanned vehicle is an unmanned underwater vehicle.

17. The method of claim 1, wherein the unmanned vehicle is an unmanned spacecraft.

* * * * *